United States Patent Office.

HENRY E. COLTON, OF NEW YORK, N. Y., ASSIGNOR TO HIMSELF AND C. T. RAYNOLDS AND COMPANY, OF THE SAME PLACE.

*Letters Patent No. 69,185, dated September 24, 1867.*

IMPROVED METALLIC PAINT.

*The Schedule referred to in these Letters Patent and making part of the same.*

TO ALL WHOM IT MAY CONCERN:

Be it known that I, HENRY E. COLTON, of the city, county, and State of New York, have invented a new and improved Metallic Paint; and I do hereby declare that the following is a full, clear, and exact description thereof, which will enable others skilled in the art to make and use the same.

This invention relates to a new combination of substances for the formation of a pigment or paint for use on the bottoms of iron ships and other iron vessels, and on all iron surfaces, whether such surfaces are exposed to the action of water or air, whereby the said vessels and iron surfaces are protected from injury from rust, and from fouling by the adhesion of obstructions of either a vegetable or animal nature; and the invention mainly consists in forming the paint by combining oxide of zinc and the oxide of lead (the latter either as minium or litharge) with mineral or animal oils, or the oil obtained from the destructive distillation of coal tar, or from the distillation of bones, and using also a certain proportion of tallow, in which oils the said oxides are to be mixed or ground. I also mix with the above substances, for certain purposes, or to meet certain circumstances and conditions, graphite, arsenious acid, and also the silicate of alumina.

One of the distinctive features of this combination is found in the fact that it contains no vegetable oil. The oil distilled from coal tar, and substances of a kindred nature, will not support vegetable life; consequently sea-weed and marine grasses will not adhere; and the paint thus formed and applied is quite as unfavorable to animal life. The oxide of zinc forms, when in contact with water, a chloride, which, as is well known, is a virulent poison; consequently barnacles and other living marine obstructions will seek locations more favorable to their development.

To thin this paint, and render it suitable to be applied with a brush to the bottoms of iron vessels, and to other iron surfaces, I use a liquid formed of a mixture of coal tar, naphtha or benzole, and common pine tar or pine resin.

In forming this paint I use a large proportion of the oxide of zinc. From the fact that this substance contains but little "body," it has not hitherto been used for the purpose to which I apply it; but by combining it with the oxide of lead to form a "body," I find, from actual experiment, that it is admirably adapted to the purpose intended.

The bottoms of iron vessels covered with this paint do not foul by the adhesion of obstructions of either vegetable or animal growth; and it is equally well adapted to the protection of iron surfaces from rust, whether such surfaces are exposed to water or air.

I do not confine myself to any particular proportion as regards the main ingredients used, nor, in fact, to all the particular substances which I may find it necessary to combine with the oxide and animal and mineral oils. It might be necessary to vary the proportions, as well as the minor ingredients, for vessels making voyages to different parts of the world, as the conditions would vary in different latitudes.

Having thus described my invention, what I claim as new, and desire to secure by Letters Patent, is—

The use of the oxide of zinc and the oxide of lead, &c., combined with mineral and animal oils, in a paint or pigment for covering the bottoms of iron vessels, and other iron surfaces, substantially as described.

HENRY E. COLTON.

Witnesses:
  CHARLES LILLIE,
  GEO. M. MATHER.